US009888079B2

(12) United States Patent
Jackson et al.

(10) Patent No.: US 9,888,079 B2
(45) Date of Patent: Feb. 6, 2018

(54) METHOD FOR MANAGING MESSAGES ACROSS A CONTROLLER AREA NETWORK

(71) Applicant: THE BOEING COMPANY, Chicago, IL (US)

(72) Inventors: Timothy E. Jackson, Mukilteo, WA (US); Sean Ramey, Lynnwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 265 days.

(21) Appl. No.: 14/813,828

(22) Filed: Jul. 30, 2015

(65) Prior Publication Data

US 2017/0034277 A1 Feb. 2, 2017

(51) Int. Cl.
| | |
|---|---|
| G01R 31/08 | (2006.01) |
| G06F 11/00 | (2006.01) |
| H04L 29/08 | (2006.01) |
| H04L 12/46 | (2006.01) |

(52) U.S. Cl.
CPC ............ *H04L 67/12* (2013.01); *H04L 12/46* (2013.01); *H04L 67/322* (2013.01)

(58) Field of Classification Search
CPC ........ H04L 67/12; H04L 12/46; H04L 67/322
See application file for complete search history.

(56) References Cited

U.S. PATENT DOCUMENTS

2015/0063120 A1* 3/2015 Horvath ............... H04L 47/283
 370/237

OTHER PUBLICATIONS

"Response Time Analysis of Messages in Controller Area Network: A Review", Journal of Computer Networks and Communications, vol. 2013, Article ID 148015, 11 pages, 2013.
Robert I. Davis et al., "Controller Area Network (CAN) Schedulability Analysis: Refuted, revisited and revised", Real-Time Syst (2007), Published Jan. 30, 2007, 34 pages.

* cited by examiner

*Primary Examiner* — Maharishi Khirodhar
(74) *Attorney, Agent, or Firm* — Marshall, Gerstein & Borun LLP

(57) ABSTRACT

A controller area network has a plurality of nodes in communication through a bus. The nodes have controllers and computer readable instructions that, when executed, perform the steps of: receiving a new message; inserting the new message into the queue in order of priority if the queue is not full; refusing the new message if the queue is full and the priority of the new message is lower than the priorities of current messages in the queue; inserting the new message into the queue in order of priority if the queue is full and the priority of the new message is higher than a priority of at least one of the current messages; removing the new message from the queue if the current time exceeds an expiration indicator; sending the new message to the controller for transmission and holding the new message in the queue during transmission; and removing the new message from the queue after successful transmission.

20 Claims, 6 Drawing Sheets

METHOD FOR MANAGING MESSAGES ACROSS A CONTROLLER AREA NETWORK

FIELD

This invention relates to controller area networks (CANs) and, more specifically, to methods for managing messages across a CAN on an aircraft.

BACKGROUND

A controller area network (CAN) is a vehicle bus standard designed to allow microcontrollers and devices to communicate with each other in applications without a host computer. Modern day aircraft typically contain one or more CANs, which are used to connect line replaceable units (LRUs), also known as nodes, through a bus. The complexity of the nodes can range from a simple input/output device up to an embedded computer with a CAN interface and sophisticated software. A node can also be a gateway allowing a standard computer to communicate over a USB or Ethernet port to the devices on a CAN network. The controllers receive messages, arbitrate the messages, and transmit the messages throughout the CAN to the other nodes and, possibly, other interconnected CANs.

In a typical CAN, each node is able to send and receive messages, but not simultaneously. Therefore, messages received by the controller are arbitrated and a single message is transmitted at a time. In certain circumstances, bus conditions outside of the control of the sending node can cause pending messages to backup in internal queues of the node. Since the CAN protocol is such that the controller has to arbitrate access to the bus and continually attempts to resend the last buffered message until successful transmission is accomplished, certain adverse effects can occur internally to the CAN.

One potential adverse effect is that a low priority message could continuously lose arbitration and hold up the transmission of higher priority messages that are scheduled for transmission in the queue, which is commonly known as Priority Inversion. Priority Inversion is caused when low priority messages are placed in a queue earlier than high priority messages. The higher priority messages are thus backlogged while the low priority messages arbitrate bus access. The potential for priority inversion increases as bus loading increases.

Another potential adverse effect is that a message could expire prior to transmission due to loss of arbitration or other network conditions. When there are bus disturbances, bus contention, or no other LRUs to acknowledge a message, a message may be kept from transmitting across the CAN. When this happens, the message may no longer accurately represent the current state of the system, but the controller will typically attempt to retransmit the last message until it is successfully acknowledged or until aborted by a CAN Controller Supervisor. These conditions could result in a delayed message transmission and stale data, particularly during lack of acknowledgements (e.g., during airplane power up when a node is in isolation awaiting other nodes to join the bus). An expired message is defined as a message that the node is unable to send on the bus within a defined latency budget for that particular message.

Some controllers, such as the FlexCAN controller from Freescale Semiconductor, have a priority based hardware solution that attempts to alleviate the problem of higher priority messages being held up by the transmission of lower priority messages. However, this solution is limited to only three priorities and has no solution for the problem of messages expiring prior to transmission due to loss of arbitration or other network conditions.

SUMMARY

In one embodiment of the present invention, an aircraft comprises a controller area network that has a plurality of nodes in communication through a bus. At least one of the plurality of nodes comprises a controller and a queue manager module including computer readable instructions that, when executed by a processor of the node, perform the steps of: receiving a new message to be inserted into a queue of the node, the new message having a priority and an expiration indicator; inserting the new message into a position in the queue in order of priority if the queue is not full; refusing the new message if the queue is full and the priority of the new message is lower than priorities of current messages in the queue; inserting the new message into a position in the queue in order of priority if the queue is full and the priority of the new message is higher than a priority of at least one of the current messages in the queue and removing the at least one of the current messages from the queue; removing the new message from the queue if the current time exceeds the expiration indicator of the new message; sending the new message to the controller for transmission when the new message is first in the queue; holding the new message in the queue during transmission; and removing the new message from the queue after receipt of an indication of successful transmission from the controller.

In another embodiment of the present invention, a method for managing messages on a controller area network comprising a plurality of nodes in communication through a bus comprises the steps of: receiving a new message to be inserted into a queue of one of the plurality of nodes, the new message having a priority and an expiration indicator; inserting the new message into a position in the queue in order of priority if the queue is not full; refusing the new message if the queue is full and the priority of the new message is lower than priorities of current messages in the queue; inserting the new message into a position in the queue in order of priority if the queue is full and the priority of the new message is higher than a priority of at least one of the current messages in the queue and removing the at least one of the current messages from the queue; removing the new message from the queue if the current time exceeds the expiration indicator of the new message; sending the new message to a controller of the one of the plurality of nodes for transmission when the new message is first in the queue; holding the new message in the queue during transmission; and removing the new message from the queue after receipt of an indication of successful transmission from the controller.

In yet another embodiment of the present invention, a controller area network comprises a plurality of nodes in communication through a bus. At least one of the plurality of nodes comprising a controller and a queue manager module including computer readable instructions that, when executed by a processor, perform the steps of: receiving a new message to be inserted into a queue of the node, the new message having a priority and an expiration indicator; inserting the new message into a position in the queue in order of priority if the queue is not full; refusing the new message if the queue is full and the priority of the new message is lower than priorities of current messages in the queue; inserting the new message into a position in the queue in order of priority if the queue is full and the priority of the new message is higher than a priority of at least one of the current messages in the queue and removing the at least one of the current messages from the queue; removing the new message from the queue if the current time exceeds the expiration indicator of the new message; sending the new message to the controller for transmission when the new message is first in the queue; holding the new message in the queue during transmission; and removing the new message from the queue after receipt of an indication of successful transmission from the controller.

The features, functions, and advantages that have been discussed can be achieved independently in various embodiments or may be combined in yet other embodiments further details of which can be seen with reference to the following description and drawings.

DESCRIPTION

Message transmission across a CAN has nuances that, when not treated appropriately, can result in unexpected CAN behaviors. While a CAN has the potential to be treated as a fire and forget system, this mindset is not always appropriate. The concept of operation for transmission management is to implement a controlled queue that handles messages and facilitates their delivery to the CAN controller for transmission.

One example described herein provides a method for managing messages across a CAN, for example on an aircraft, that can ensure that the highest priority messages are ordered to transmit first and that expired messages are not transmitted and are removed from the queue. For instance, one method can aggregate aging, prioritization, and transmission abort in order to realize a more autonomous method of deterministic arbitration for the CAN.

Figure 1:
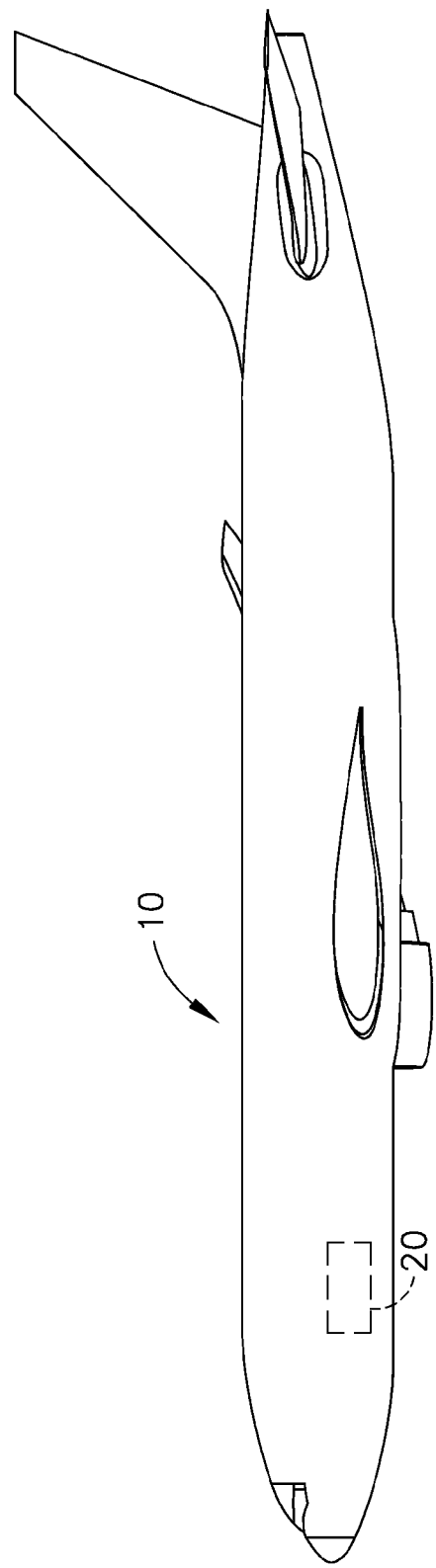
FIG. 1 is a side view of an aircraft including an example CAN.

Referring to FIG. 1, an example aircraft 10 is shown that includes at least one CAN 20. In the example, a single CAN 20 is shown for simplicity, however, it is understood that aircraft 10 can have any number of individual or interconnected CANs as required for the particular aircraft and its systems. In addition, aircraft 10 can be any type of aircraft or, alternatively, any other type of vehicle.

Figure 2:
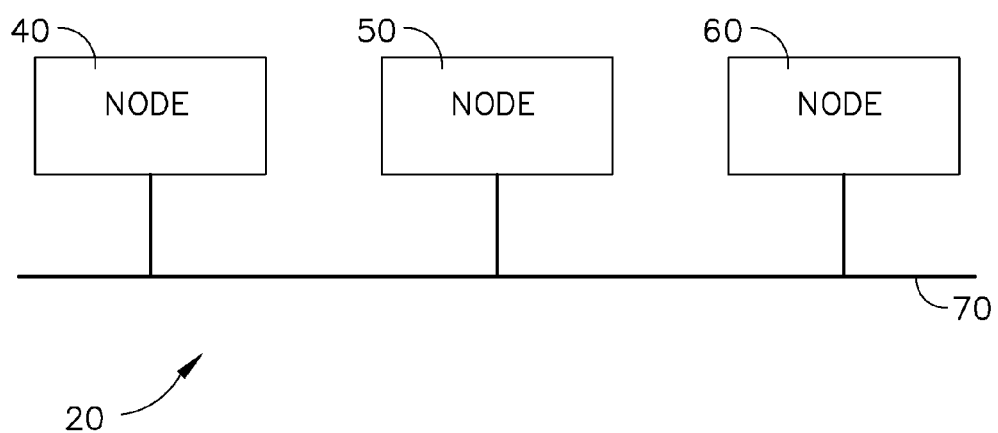
FIG. 2 is a schematic representation of the CAN of FIG. 1.
Figure 3:
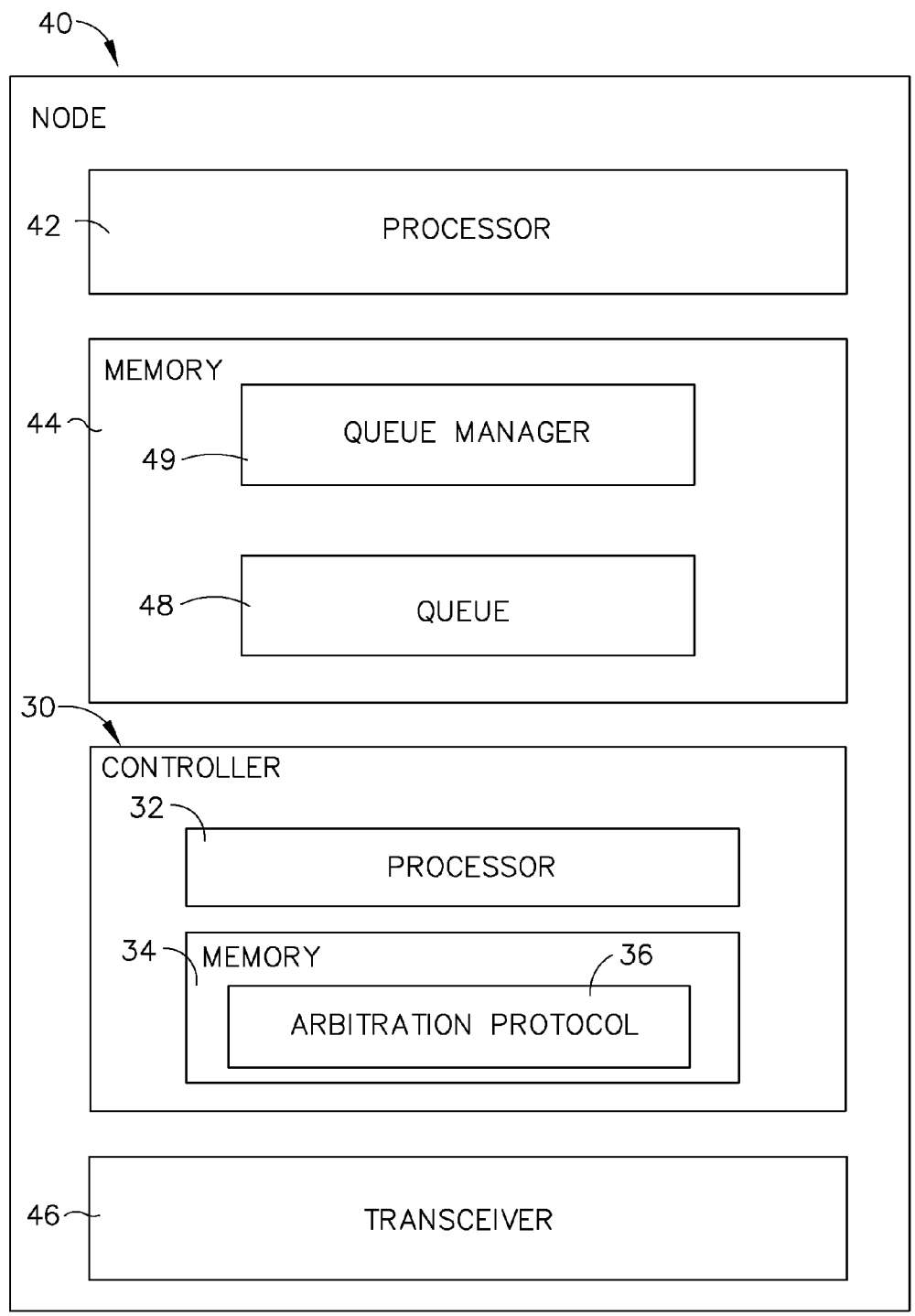
FIG. 3 is a schematic representation of a node of FIG. 2.
Figure 4:
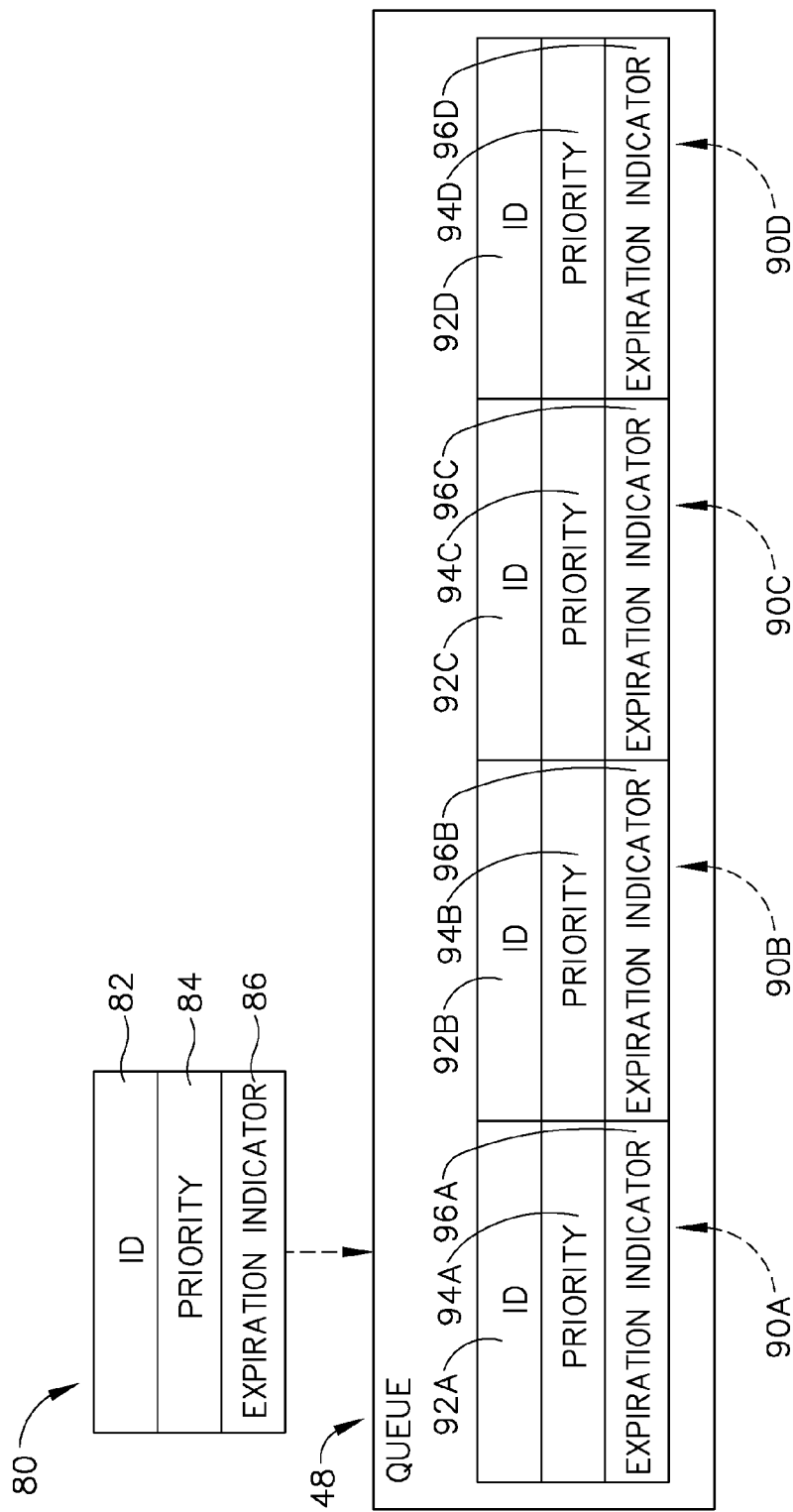
FIG. 4 is a schematic representation of the queue of FIG. 3.

As can be seen in FIGS. 2-4, CAN 20 generally includes a plurality of nodes 40, 50, 60 communicatively connected through a bus 70. Again, in the example, three nodes 40, 50, 60 are shown for simplicity, however, it is understood that CAN 20 can have any number of nodes as required. Nodes 40, 50, 60 are able to send and receive messages through bus 70, but not simultaneously. In addition, while a single individual CAN 20 is illustrated, CAN 20 can also be interconnected with any number of additional CANs as desired for a particular application.

Nodes 40, 50, 60 of CAN 20 will generally be similar in structure, therefore, only a single node 40 is described in detail herein. Node 40 is typically some type of sensor, actuator, and/or other control device and in aircraft 10 can be a line replaceable unit (LRU), such as a proximity detector, ice detector, control panel, sensor, motor controller, smart sensor (e.g., air data monitor), etc. Node 40 can generally include a processor 42, at least one memory 44, a controller 30, and a transceiver 46. A queue 48 is located in memory 44 and is used to organize and temporarily store messages 90A-D that are to be sent to controller 30 for transmission over CAN 20. Messages 90A-D can each have a unique identifier 92A-D, a priority 94A-D, and an expiration indicator 96A-D. Expiration indicator 96A-D can be defined in milliseconds, with "−1" used for messages with no expiration time. Queue manager module 49, which is typically a set of computer readable instructions that can be executed by processor 42 to perform the steps described below, is stored in memory 44 and is executed by processor 42 to manage the messages in queue 48. Transceiver 46 converts data received off of bus 70 to levels that node 40 can use and back.

Controller 30 can generally include a processor 32 and at least one memory 34. An arbitration protocol module 36, which is typically a set of computer readable instructions that can be executed by processor 32, is stored in memory 34 and is executed by processor 32 to perform the arbitration function of controller 30.

Queue 48 is not dependent on the state of controller 30 and messages in queue 48 should not be impacted by state transitions of controller 30. Queue manager module 49 continues to perform its queue management processes regardless of the state of controller 30. For example, controller 30 can clear its transmit buffer when it transitions between BUS Off and Normal Mode; which should not affect queue 48. However, if this were to occur, the transmit buffer of controller 30 would have to be reloaded from the "front" of queue 48.

Figure 5:
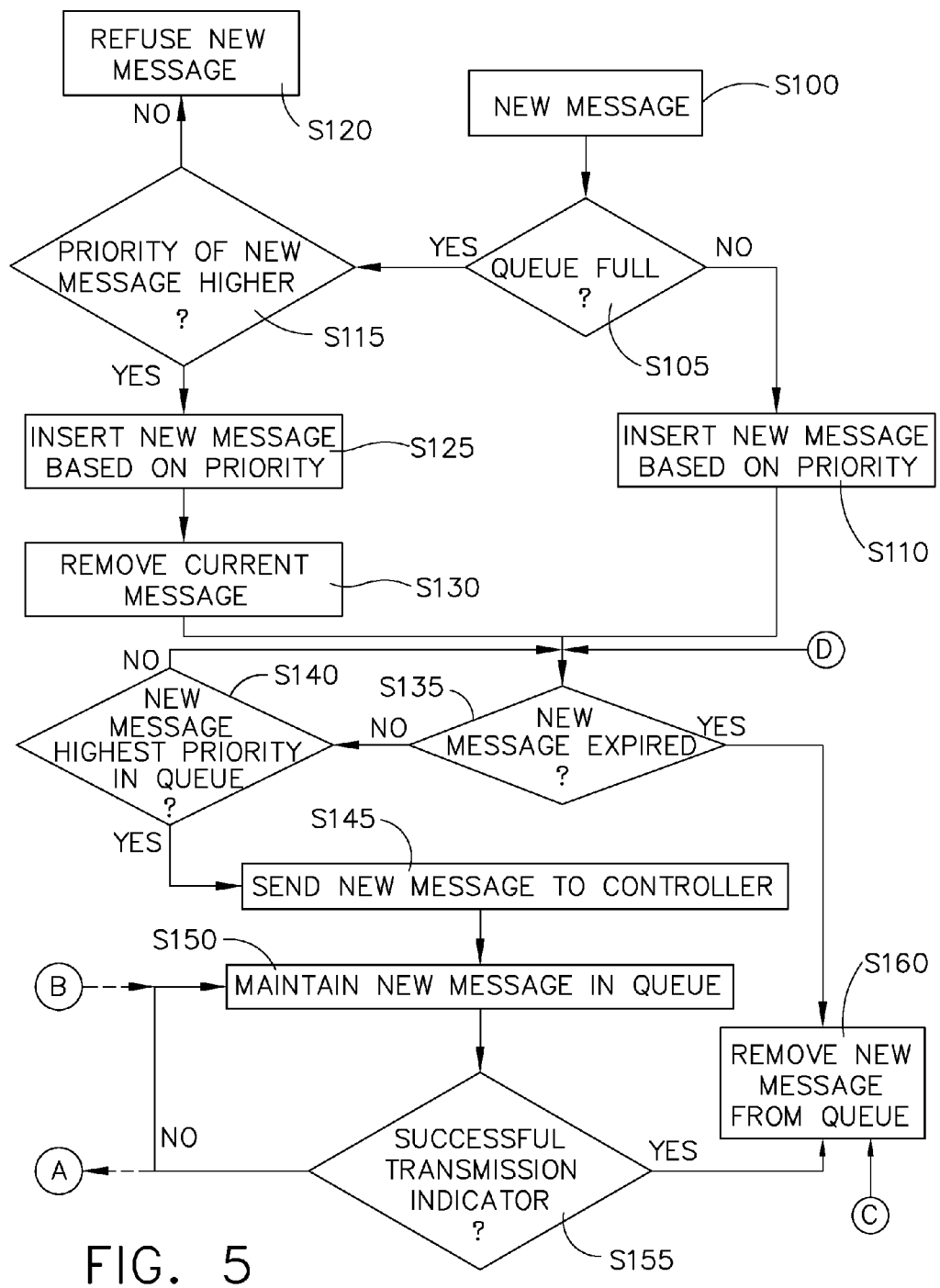
FIG. 5 is an example flowchart showing a method for managing a new message on a controller area network.

Referring to FIG. 5, various steps of an example method are shown to manage messages within queue 48 to be sent to controller 30 for transmission when a new message 80 is received. The example method can ensure that the highest priority messages are ordered to transmit before lower priority messages and that expired messages are not transmitted and are removed from queue 48 and is designed to ensure that priority of messages is taken into account. For a single queue implementation, inserting higher priority messages in front of lower priority messages prevents priority inversion. For multiple queue implementations, higher priority queues are flushed before lower priority queues are serviced.

Although the method shown in FIG. 5 and described below consists of multiple steps, it will be understood that each step could be implemented individually or any number of steps could be implemented in any combination or order to improve the management of messages across CAN 20.

During operation, a number of current messages 90A-D may reside in queue 48 of node 40, waiting to be sent to controller 30 for transmission over CAN 20. Queue manager module 49 can use the priority 94A-D of each current message 90A-D to prioritize the transmission of current messages 90A-D to controller 30, such that messages with a higher priority 94A-D are scheduled to be sent before those with a lower priority 94A-D. In addition, queue manager module 49 can monitor the expiration indicator 96A-D to determine when a current message 90A-D has expired.

When a message is at the "front" of queue 48 (e.g., has the highest priority and has not expired) and queue manager module 49 determines that controller 30 is available, the message at the "front" of queue 48 is sent to controller 30 for transmission over CAN 20. When a message in queue 48 has expired (e.g., the current time exceeds the messages expiration indicator), queue manager module 49 removes the expired message from queue 48.

At Step S100 in FIG. 5, a new message 80 is to be inserted into queue 48. In a typical application, processor 42 can generate new message 80 and can send new message 80 to queue manager module 49 or can send a notification to queue manager module 49 that there is a new message 80 available to be inserted into queue 48. New message 80 includes a unique identifier 82, a priority 84, and an expiration indicator 86. Expiration indicator 86 can be defined in milliseconds, with "−1" used for messages with no expiration time.

At Step S105, queue manager module 49 determines if queue 48 is full. When queue 48 is full, but a new message needs to be inserted, a message will be lost, constituting an overflow, which can be tracked in a MIB counter. It can be important to choose message expiration times carefully and continually check for expired current messages to ensure that newer messages aren't unintentionally denied insertion into queue 48 due to older messages of the same priority still residing in queue 48.

If queue 48 is not full, at Step S110, queue manager module 49 inserts new message 80 into queue 48 at a position based on its priority 84. For example, new message 80 will be inserted into queue 48 ahead of current messages 90A-D that have a lower priority 94A-D and behind current messages 90A-D that have a higher priority 94A-D. If there are current messages 90A-D that have the same priority 94A-D as the priority 84 of new message 80, new message 80 can be prioritized based on expiration indicator 86, age of message (e.g., newest messages first or oldest messages first), or any other criteria desired. The method then continues with Step S135.

If queue 48 is full, at Step S115, queue manager module 49 determines if priority 84 of new message 80 is lower than all priorities 94A-D of current messages 90A-D. If priority 84 is lower than all priorities 94A-D, at Step S120, new message 80 is refused by queue manager module 49 and is not inserted into queue 48. If new message 80 is not entered, an event can be created and new message 80 can be returned back to processor 42 or a notification can be sent to processor 42 that new message 80 cannot be entered and processor 42 can take appropriate action. If priority 84 is higher than at least one priority 94A-D, the method continues with Steps S125 and S130. If priority 84 of new message 80 is the same as the lowest priority 94A-D, either the oldest or newest of new message 80 and current message 90A-D, or the one closest to its expiration indicator, or any other criteria desired for a particular application, having the same priority can be removed from queue 48. If, based on the criteria implemented, new message 80 "loses" to the current message with the same priority, the method continues with Step S120. If, based on the criteria implemented, new message 80 "wins" over the current message with the same priority, the method continues with Steps S125 and S130.

At Steps S125 and S130, queue manager module 49 removes current message 90A-D having the lowest priority (the message at the "back" of queue 48) that is lower than priority 84 of new message 80 and inserts new message 80 into queue 48 at a position based on its priority 84, as discussed above for Step 110. If more than one of the current messages 90A-D have the same priority 94A-D, which is lower than priority 84 of new message 80, which current message 90A-D to remove can be determined by expiration indicator 96A-D, age of messages (e.g., newest messages first or oldest messages first), or any other criteria desired. The removed current message 90A-D with the lowest priority is then returned to processor 42, or a notification that the message has been removed is sent to processor 42, and the process continues with Step S135. An event can also be created the message has been removed from queue 48 and processor 42 can take appropriate action.

At Step S135, queue manager module 49 determines if the current time has exceeded expiration indicator 86 of new message 80. When a message has resided in queue 48 too long, then it may no longer contain valid data or reflect the current state of the system. If the current time exceeds the expiration indicator 86 (e.g., new message 80 age is past the expiration limit), queue manager module 49 removes new message 80 from queue 48 at Step S160. Messages removed from queue 48 can be tracked by a counter and can either be returned to processor 42 or a notification of the removal sent to processor 42. If expiration indicator 86 has not been exceeded, new message 80 remains in queue 48 and the process continues with Step S140. Employing a "pruning method" such as this ensures that expired, time-sensitive messages are removed from queue 48 and helps prevent node 40 from unloading queue 48 on bus 70 as fast as possible once bus contention is resolved or a transmission acknowledgement is received. It is possible that not all messages need to expire, depending on their requirements and function. For example, some messages could have an infinite expiration limit.

At Step S140, queue manager module 49 determines if new message 80 has the highest priority in queue 48. If new message 80 does not have the highest priority in queue 48, the process loops back to Step S135 and queue manager module 49 continues to monitor for expiration of new message 80. Once new message 80 has moved to the "front" of queue 48 (e.g., it has the highest priority of all message in the queue), at Step S145, queue manager module 49 sends new message 80 to controller 30 for transmission across CAN 20 and, at Step S150, a copy of new message 80 is maintained in queue 48. The "front" of queue 48 is the next message candidate to be sent to controller 30 for transmission.

At Step S155, queue manager module 49 determines if an indication of successful transmission of new message 80 has been received from controller 30. If no indication has been received, the process loops back to Step S150 and queue manager module 49 continues to check for the indication of successful transmission. Once an indication of successful transmission of new message 80 is received from controller 30, queue manager module 49 removes new message 80 from queue 48 at Step S160.

Figure 6:
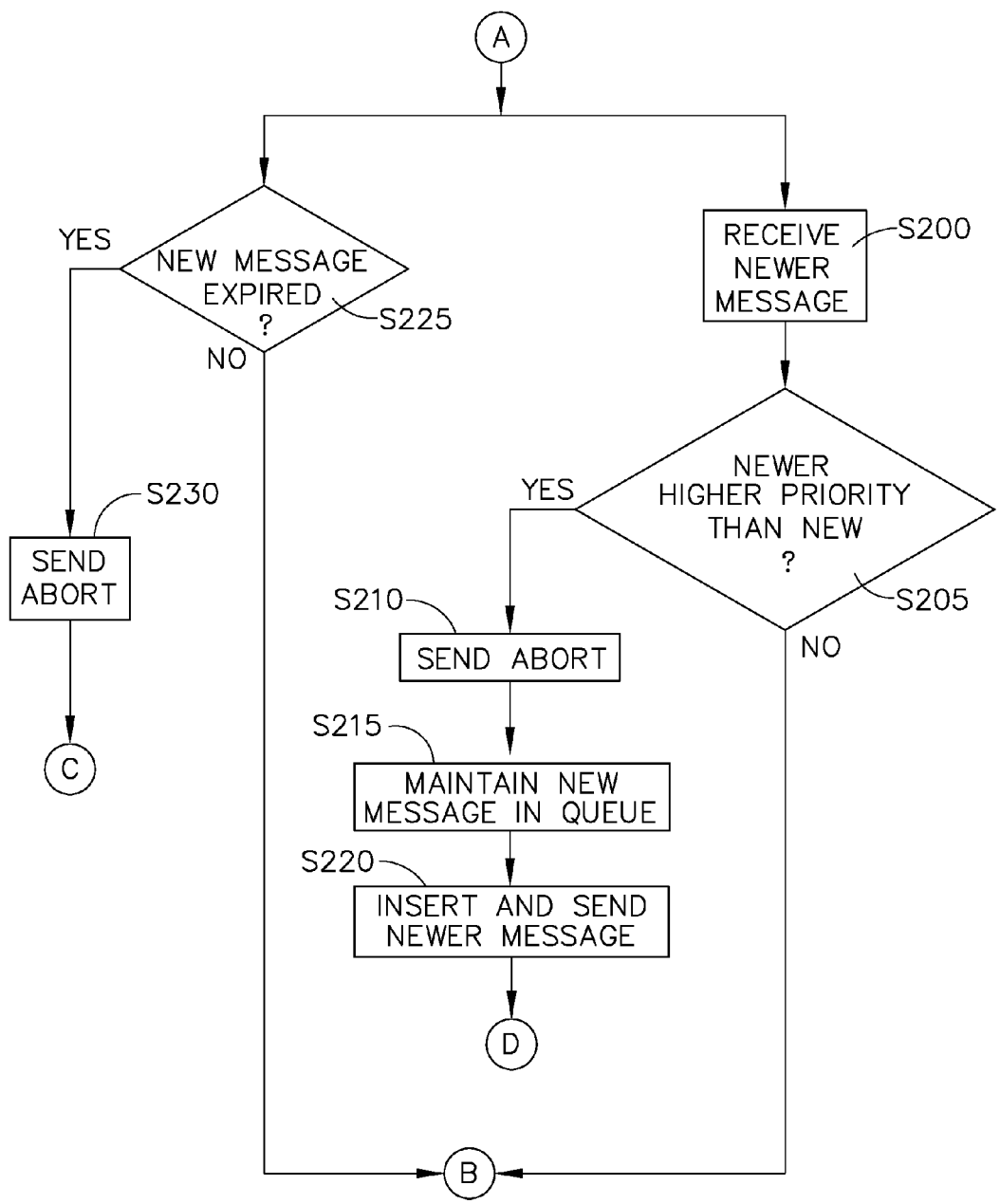
FIG. 6 is an example flowchart showing a method for managing the new message on controller area network that has been sent from a queue of a node to a controller for transmission.

Referring to FIG. 6, various additional steps are shown to manage messages that have been sent from queue 48 to controller 30 for transmission. To prevent stale messages and priority inversion, requirements are needed to abort a message at controller 30 if the message has not yet completed transmission. When a message has been aborted, a counter can be incremented. The example method can ensure that the highest priority messages are transmitted before lower priority messages and that expired messages are not transmitted. Although FIG. 6 consists of multiple steps, it will be understood that each step could be implemented individually or any number of steps could be implemented in any combination and/or order to improve the management of messages across CAN 20. In addition, any or all of the steps shown in FIG. 6 could be used with any or all of the steps shown in FIG. 5 to improve the management of messages across CAN 20. For example, as shown in FIG. 6, the steps are shown as continuing from Step S155 described above.

As described above, at Step S145, queue manager module 49 sends new message 80 to controller 30 for transmission and retains a copy of new message 80 in queue 48 at Step S150. New message 80 remains in queue 48 until it has been transmitted by controller 30 and a successful transmission indicator has been received by queue manager module 49, or until aborted, as described below. Queue manager module 49 monitors the status of transmission of new message 80 to determine if an indication of successful transmission is received from controller 30, as shown in Step 155.

While queue manager module 49 is waiting to receive the indication of successful transmission of new message 80, queue manager module 49 can continue to monitor the age of new message 80. At Step S225, queue manager module 49 determines if new message 80 has exceeded expiration indicator 86. If expiration indicator 86 has not been exceeded, the process can continue with Step S150 and queue manager module 49 can continue to monitor the age and transmission status of new message 80. If expiration indicator 86 has been exceeded (e.g., new message 80 age is past the expiration limit), the process continues with Step S230, where queue manager module 49 sends an abort command to controller 30 instructing controller 30 to about the transmission of new message 80. The process then continues with Step S160 and new message 80 is removed from queue 48.

In addition to monitoring the age of new message 80, if no indication of successful transmission of new message 80 has been received and a newer message is received, as shown in Step S200, at Step S205 queue manager module 49 determines if the newer message has a priority that is higher than priority 84 of new message 80. If the newer message has a priority that is lower than priority 84 of new message 80, the process continues with Step S160 and queue manager module 49 can continue to monitor the transmission status of new message 80 and the receipt of newer messages. If the newer message has a priority that is higher than priority 84 of new message 80, the process continues with Step S210.

At Step S210, queue manager module 49 sends an abort command to controller 30 instructing controller 30 to abort the transmission of new message 80 and can wait for an indication of transmission abort success from controller 30. Even though transmission of new message 80 is aborted, a copy of new message 80 remains in queue 48 for re-transmission at a later time. Therefore, at Step S215, queue manager module 49 ensures that new message 80 is maintained in queue 48.

At Step S220, queue manager module 49 inserts the newer message into queue 48 ahead of new message 80 and sends the newer message to controller 30 for transmission across CAN 20. Just as described above for new message 80, when the newer message is sent to controller 30 a copy of the newer message is maintained in queue 48. The process can then continue with Step S135 and queue manager module 49 can continue to monitor the age of new message 80.

Typically, most of the steps described above reside within and are performed by queue manager module 49. If controller 30 were to provide some of this functionality, it can be used to simplify the design as long as it satisfies the requirements above.

While various embodiments have been described above, this disclosure is not intended to be limited thereto. Variations can be made to the disclosed embodiments that are still within the scope of the appended claims.

What is claimed is:

1. An aircraft comprising a controller area network, the controller area network comprising:
    a plurality of nodes in communication through a bus, at least one of the plurality of nodes comprising a controller and a queue manager module including computer readable instructions that, when executed by a processor, perform the steps of:
        receiving a new message to be inserted into a queue of the at least one of the plurality of nodes, the new message having a priority and an expiration indicator;
        inserting the new message into a position in the queue in order of priority when the queue is not full;
        refusing the new message when the queue is full and the priority of the new message is lower than priorities of current messages in the queue;
        inserting the new message into a position in the queue in order of priority when the queue is full and the priority of the new message is higher than a priority of at least one of the current messages in the queue and removing the at least one of the current messages from the queue;
        removing the new message from the queue when a current time exceeds the expiration indicator of the new message;
        sending the new message to the controller for transmission when the new message is first in the queue;
        holding the new message in the queue during transmission; and
        removing the new message from the queue after receipt of an indication of successful transmission from the controller.

2. The aircraft of claim 1, wherein the computer readable instructions further perform the steps of:
    sending an abort command to the controller and maintaining the new message in the queue when a newer message is received by the at least one of the plurality of nodes during the transmission of the new message and the newer message has a priority that is higher than the new message; and
    sending an abort command to the controller and removing the new message from the queue when the new message exceeds the expiration indicator during transmission of the new message.

3. The aircraft of claim 2, wherein the computer readable instructions further perform the step of removing the new message from the queue after receipt of an indication of transmission abort success from the controller.

4. The aircraft of claim 1, wherein the at least one of the plurality of nodes is a line replaceable unit.

5. The aircraft of claim 4, wherein the line replaceable unit is one of a proximity detector, and ice detector, a control panel, a sensor, a motor controller, or a smart sensor.

6. The aircraft of claim 1, wherein when the queue is full and the priority of the new message is higher than a priority of a plurality of the current messages in the queue, the at least one of the current messages removed from the queue is the current message of the plurality of the current messages in the queue that has the least amount of time to reach its corresponding expiration indicator and has the lowest priority of the plurality of the current messages.

7. The aircraft of claim 1, wherein when the queue is full and the priority of the new message is higher than a priority of a plurality of the current messages in the queue, the at least one of the current messages returned removed from the queue is the current message of the plurality of the current messages in the queue that has been in the queue for the longest time compared to the other of the plurality of current messages and has the lowest priority of the plurality of the current messages.

8. A method for managing messages on a controller area network comprising a plurality of nodes in communication through a bus, the method comprising the steps of:
receiving a new message to be inserted into a queue of one of the plurality of nodes, the new message having a priority and an expiration indicator;
inserting the new message into a position in the queue in order of priority when the queue is not full;
refusing the new message when the queue is full and the priority of the new message is lower than priorities of current messages in the queue;
inserting the new message into a position in the queue in order of priority when the queue is full and the priority of the new message is higher than a priority of at least one of the current messages in the queue and removing the at least one of the current messages from the queue;
removing the new message from the queue when a current time exceeds the expiration indicator of the new message;
sending the new message to a controller of the one of the plurality of nodes for transmission when the new message is first in the queue;
holding the new message in the queue during transmission; and
removing the new message from the queue after receipt of an indication of successful transmission from the controller.

9. The method of claim 8, further comprising the steps of:
sending an abort command to the controller and maintaining the new message in the queue when a newer message is received by the node during the transmission of the new message and the newer message has a priority that is higher than the new message; and
sending an abort command to the controller and removing the new message from the queue when the new message exceeds the expiration indicator during transmission of the new message.

10. The method of claim 9, further comprising the step of removing the new message from the queue after receipt of an indication of transmission abort success from the controller.

11. The method of claim 8, wherein the node comprises one of a proximity detector, and ice detector, a control panel, a sensor, a motor controller, or a smart sensor.

12. The method of claim 8, wherein when the queue is full and the priority of the new message is higher than a priority of a plurality of the current messages in the queue, the at least one of the current messages removed from the queue is the current message of the plurality of the current messages in the queue that has the least amount of time to reach its corresponding expiration indicator and has the lowest priority of the plurality of the current messages.

13. The method of claim 8, wherein when the queue is full and the priority of the new message is higher than a priority of a plurality of the current messages in the queue, the at least one of the current messages returned removed from the queue is the current message of the plurality of the current messages in the queue that has been in the queue for the longest time compared to the other of the plurality of current messages and has the lowest priority of the plurality of the current messages.

14. A controller area network comprising:
at least one node in communication with other nodes through a bus, the at least one node comprising a controller and a queue manager module including computer readable instructions that, when executed by a processor, perform the steps of:
receiving a new message to be inserted into a queue of the at least one node, the new message having a priority and an expiration indicator;
inserting the new message into a position in the queue in order of priority when the queue is not full;
refusing the new message when the queue is full and the priority of the new message is lower than priorities of current messages in the queue;
inserting the new message into a position in the queue in order of priority when the queue is full and the priority of the new message is higher than a priority of at least one of the current messages in the queue and removing the at least one of the current messages from the queue;
removing the new message from the queue when a current time exceeds the expiration indicator of the new message;
sending the new message to the controller for transmission when the new message is first in the queue;
holding the new message in the queue during transmission; and
removing the new message from the queue after receipt of an indication of successful transmission from the controller.

15. The controller area network of claim 14, wherein the computer readable instructions further perform the steps of:
sending an abort command to the controller and maintaining the new message in the queue when a newer message is received by the at least one node during the transmission of the new message and the newer message has a priority that is higher than the new message; and
sending an abort command to the controller and removing the new message from the queue when the new message exceeds the expiration indicator during transmission of the new message.

16. The controller area network of claim 15, wherein the computer readable instructions further perform the step of removing the new message from the queue after receipt of an indication of transmission abort success from the controller.

17. The controller area network of claim 14, wherein the at least one node is a line replaceable unit of an aircraft.

18. The controller area network of claim 17, wherein the line replaceable unit is one of a proximity detector, and ice detector, a control panel, a sensor, a motor controller, or a smart sensor.

19. The controller area network of claim 14, wherein when the queue is full and the priority of the new message is higher than a priority of a plurality of the current messages in the queue, the at least one of the current messages removed from the queue is the current message of the plurality of the current messages in the queue that has the least amount of time to reach its corresponding expiration indicator and has the lowest priority of the plurality of the current messages.

20. The controller area network of claim 14, wherein when the queue is full and the priority of the new message is higher than a priority of a plurality of the current messages in the queue, the at least one of the current messages returned removed from the queue is the current message of the plurality of the current messages in the queue that has been in the queue for the longest time compared to the other of the plurality of current messages and has the lowest priority of the plurality of the current messages.

\* \* \* \* \*

UNITED STATES PATENT AND TRADEMARK OFFICE
CERTIFICATE OF CORRECTION

PATENT NO. : 9,888,079 B2  
APPLICATION NO. : 14/813828  
DATED : February 6, 2018  
INVENTOR(S) : Timothy E. Jackson et al.

Page 1 of 1

It is certified that error appears in the above-identified patent and that said Letters Patent is hereby corrected as shown below:

In the Claims

Column 8, Line 58, "and ice" should read -- an ice --.

Column 9, Line 52, "and ice" should read -- an ice --.

Column 10, Line 54, "and ice" should read -- an ice --.

Signed and Sealed this  
Twenty-first Day of August, 2018

Andrei Iancu  
*Director of the United States Patent and Trademark Office*